United States Patent [19]

Grondin et al.

[11] Patent Number: 5,518,189
[45] Date of Patent: May 21, 1996

[54] BENEFICIATION OF FLAKE GRAPHITE

[75] Inventors: Tony Grondin, Preissac; Jean-Guy St-Hilaire, St. Antoine, both of Canada

[73] Assignee: Harbison-Walker Refractories Company, Dallas, Tex.

[21] Appl. No.: 417,707

[22] Filed: Apr. 6, 1995

Related U.S. Application Data

[63] Continuation of Ser. No. 101,555, Aug. 3, 1993, abandoned.

[51] Int. Cl.⁶ .................................................. B02C 23/36
[52] U.S. Cl. ............................. 241/20; 241/24.1; 241/27
[58] Field of Search ................................. 241/20, 21, 24, 241/27

[56] References Cited

U.S. PATENT DOCUMENTS

| | | | |
|---|---|---|---|
| 4,496,533 | 1/1985 | Clausius | 423/448 |
| 4,533,086 | 8/1985 | Junttila | 241/16 |
| 4,538,764 | 9/1985 | Dunbar | 241/5 |
| 4,987,175 | 1/1991 | Bunnell, Sr. | 524/449 |
| 4,993,646 | 2/1991 | Narukawa | 241/37.5 |
| 4,999,121 | 3/1991 | DeBlock et al. | 252/8.8 |
| 5,019,446 | 5/1991 | Bünnell, Sr. | 428/324 |
| 5,065,948 | 11/1991 | Bunnell, Sr. | 241/199.5 |
| 5,330,680 | 7/1994 | Sakawaki et al. | 252/309 |

FOREIGN PATENT DOCUMENTS

| | | |
|---|---|---|
| 0106515 | 7/1982 | Japan. |
| 2083205 | 3/1990 | Japan. |
| 403050110 | 3/1991 | Japan. |
| 232936 | 8/1925 | United Kingdom. |

*Primary Examiner*—John Husar
*Attorney, Agent, or Firm*—John L. Sigalos

[57] ABSTRACT

This invention concerns a method of beneficiating graphite to a higher purity level by dislodging the impurities from graphite by attrition preferably in an attrition cell which has at least one set of opposing pitched impellers. A pulp is formed preferably essentially consisting of a flake graphite:attrition adjuvant:water in a ratio of 1:2:0.8 to 10 and this pulp subjected to attrition in an attrition cell.

10 Claims, 2 Drawing Sheets

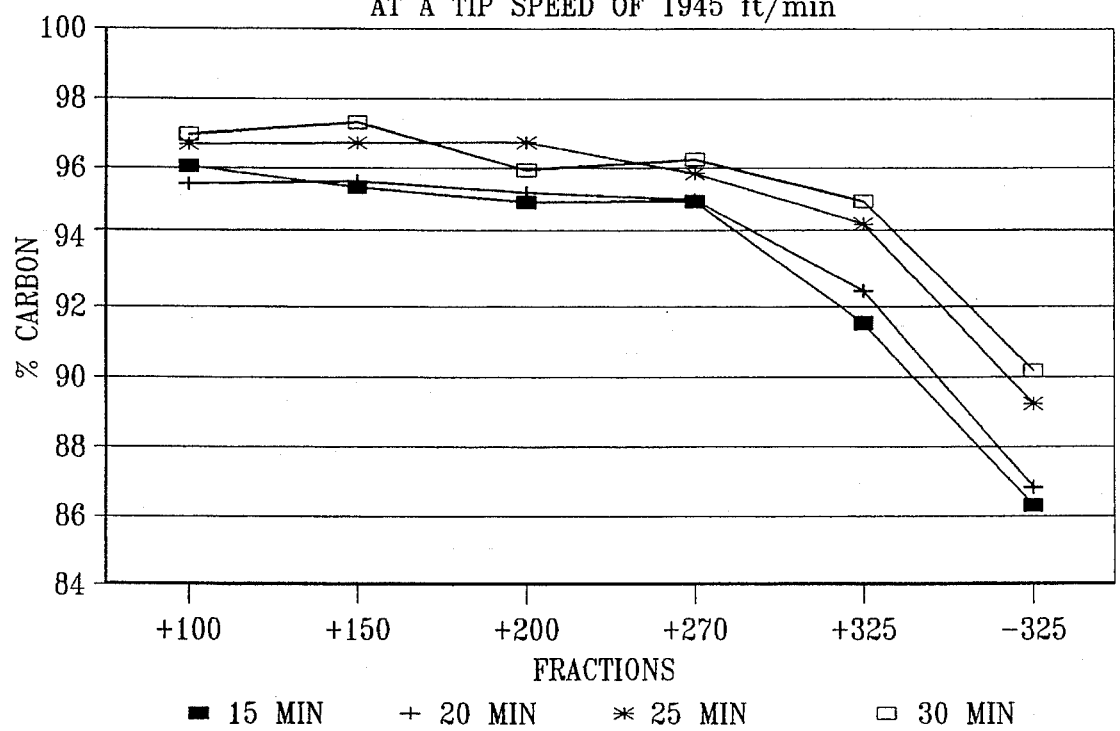

BENEFICIATION OF FLAKE GRAPHITE

This application is a continuation of application Ser. No. 08/101,555, filed Aug. 3, 1993, now abandoned.

BACKGROUND OF THE INVENTION

This invention relates to a method of beneficiating graphite to higher purity levels by means of attrition.

Graphite, particularly flake graphite, is used in refractories, as a coating material in foundries, in brake linings, batteries, carbon brushes, as a precursor for expandable graphite, and as a lubricant.

In refractories, flake graphite imparts high thermal conductivity and improved slag resistance. During long term service at elevated temperatures the impurities in the graphite tend to degrade the high temperature stability of the flakes. Because of this there is an increasing tendency in refractory applications to use flake graphite of higher purity. For example, U.S. Pat. No. 4,912,068 describes the significant increase in hot strength made possible by using 99% pure flake graphite. Flake graphite sold to the battery market requires an impurity level of ≦300 ppm. Flake graphite sold to the expandable graphite market requires a purity of at least 96%. Large, high purity flakes command a higher price and are becoming increasingly desired. All of these tendencies are driving graphite producers to find new methods of producing high purity flake graphite.

Graphite of exceptional high purity can occur in veins and Sri Lankan vein graphite is an example of the same. Simple hand selection can be used to grade the lumps of such vein graphite into various purity levels.

In contrast, flake graphite occurs as flakes disseminated in a host rock and it is difficult to separate the flakes from the rock without destroying the size of the flakes and ensuring that the gangue is removed from the flakes to achieve a high level of purity. The rock containing the flake graphite must be ground to liberate the flake graphite and then the graphite is floated to separate the flakes from the rock and other impurities.

Such flotation is accomplished by introducing an aqueous slurry of the ground mass into a stirred cell wherein the free graphite is separated from the gangue by oil assisted buoyancy. Columns, or other beneficiation devices, such as tables, cyclones, or the like may also be used. The tails are then ground progressively finer to achieve liberation of the remaining flakes. This grinding further decreases flake size. To increase graphite purity, the concentrate must be further beneficiated. To achieve higher purity, especially in the fines (−100 mesh and finer fractions) the graphite can be chemically treated either with acids or alkalies or with a combination of the two. This process is expensive, time consuming, can modify flake properties, and can have a severe environmental impact. Another means to increase the purity of the concentrates is to heat them in a furnace at temperatures above 4000° F. to vaporize the impurities.

The need exists to efficiently produce flake graphite at purity levels >96% without removing the impurities by chemical or thermal processes and/or without significantly decreasing the size of the flakes. Much effort has been expended in recent years to accomplish these goals, such as evaluation of different milling techniques (pebble mills, rod mills, vertical stirred mills, etc.) but the desired combination of economically achieving high purity and large flakes has not been met.

SUMMARY OF THE INVENTION

It has been unexpectedly discovered that attrition can be used to significantly increase the purity of flake graphite without causing a large decrease in flake size.

The main object of this invention is to quickly and economically increase the purity level of flake graphite without significant destruction of flake size.

The aforementioned difficulties of upgrading flake graphite have been significantly lessened by this invention. It has been discovered that attrition can be used to dislodge the impurities attached to the flakes without destroying the flake itself. Purity levels in excess of 99% can be attained without a drastic decrease in flake size.

Preferably, beneficiation is accomplished by milling a mixture of graphite, an attrition adjuvant, and water having a weight ratio of about 1:2:0.8 to 10 respectively.

BRIEF DESCRIPTION OF THE DRAWINGS

FIG. 3 is a graph showing flake graphite carbon content versus particle size fractions at a fixed tip speed.

DETAILED DESCRIPTION

Figure 1:
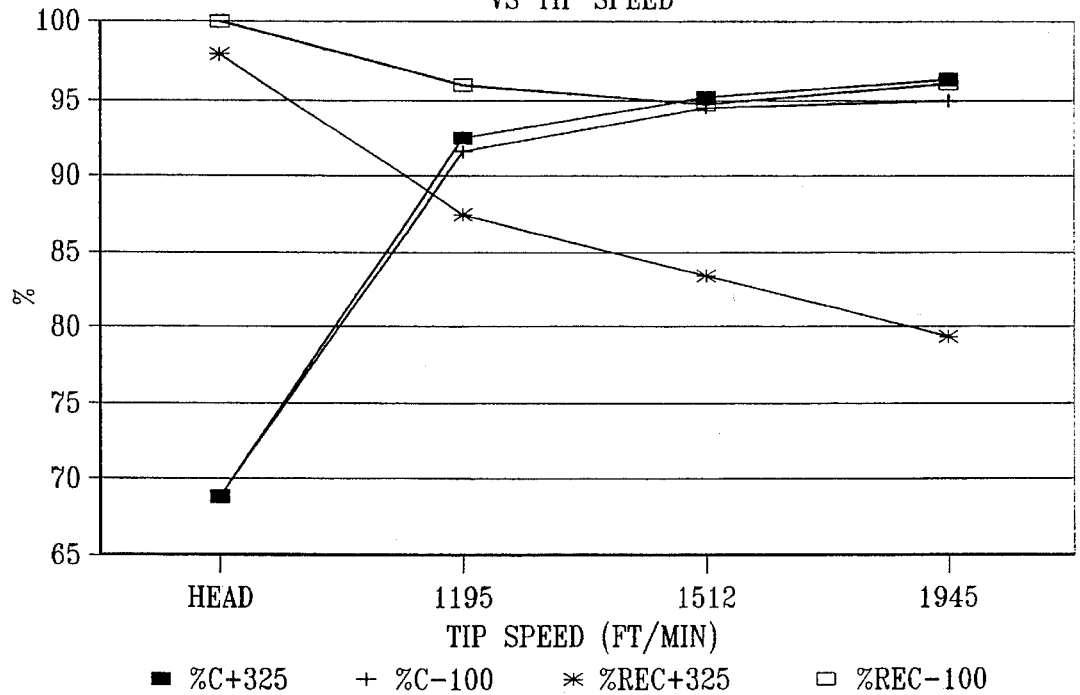
FIG. 1 is a graph showing flake graphite carbon content and % recovery versus tip speed of an attrition mill impeller.

While the instant invention can be carried out using a slurry or pulp of the flake graphite and water alone, it is preferred to also include an attrition adjuvant in the pulp to assist in removing the impurities from the flake surfaces. Without the use of an attrition adjuvant one cannot obtain the highest purity levels of flake graphite; i.e., in the high 90%. Such adjuvants can be coarse sand, coarse graphitic ore, or a combination thereof or other angular particulate matter. referably +35 mesh sand, +35 mesh graphitic ore, or a mixture thereof is used The invention will be further described in connection with the use of such adjuvants.

As used herein, the term "attrition" means a rubbing action created by the individual flake graphite flakes rubbing against each other in an aqueous pulp which is agitated with a force sufficient to impel the flakes themselves or flakes and adjuvants against each other to effect the rubbing action necessary to physically remove their surface impurities. As noted above, attrition adjuvants are preferably utilized to assist in the attrition and thereby minimize the time required to obtain high purity flakes.

Such attrition can be satisfactorily carried out using commercially available attrition cells, such as a WEMCO attrition machine or a DENVER attrition machine. Most preferably, attrition cells having at least one set of opposing pitched impellers are used. Such machines are typically used to scrub glass-grade sand, to remove clays from iron ore, and to break up bonded agglomerates. Materials, as noted, are cleaned in such devices by rubbing of the individual particles against each other and the energy necessary to impart the force to cause the particles in the pulp to rub against each other is supplied by impellers which cause the degree of turbulence of the pulp necessary to effect the necessary attrition action.

The specific degree of turbulence required for any given flake graphite pulp will vary, dependent mainly on the solids concentration of the slurry, particular attrition machine used, and mineralogy of the ore. The specific optimum conditions (impeller speed, pulp solids concentration, attrition time, and the like) can be readily determined for any given flake graphite and attrition machine combination by routine experimentation following the details set forth herein. The optimum conditions are readily arrived at by noting the purity of the flake graphite obtained and the percentage of different mesh size flakes preserved after attrition. The point at which both are at a maximum is the optimum. The pulp solids, impeller speed, and attrition time can be varied until such optimum is attained.

After the flake graphite has been mined and ground and a flake graphite concentrate has been formed by flotation, as is conventional, the resultant flake graphite is then beneficiated in accordance with the present invention.

The floated flake graphite concentrate in slurry form is preferably combined with an attrition adjuvant in a weight ratio of concentrate, attrition adjuvant, and water of about 1:2:0.8 to 10, preferably 1:2:2.5. The resultant solids content of the slurry can vary from about 30% to 70% solids, with an optimum solids content being about 55%.

The attrition in the attrition device is carried out at ambient temperature with the attrition time varying dependant mainly on the solids content of the slurry; i.e., the higher the solids content, the shorter the attrition time. The optimum conditions for any given flake graphite concentrate, slurry solids contents, and attrition cell can be determined by routine experimentation.

After attrition, the pulp is screened to remove the coarse attrition adjuvant for reuse and then the remaining pulp is subjected to a conventional flotation where the beneficiated flake graphite is separated from the impurities. In some instances where there is very coarse graphite flakes it may be desirable to first float and then screen.

The invention will be further described in connection with the following examples which are set forth for purposes of further illustration only.

Example 1

A Denver one-half liter-size attrition cell was utilized and an aqueous pulp of −100 mesh flake graphite and coarse sand placed therein. The pulp was stirred with the impeller for various times and speeds to effect attrition and a comparative test with the grinding action produced by a conventional flotation rotor was also carried out.

Use of the cell which had a conventional flotation rotor at the base of the cell resulted in significant destruction of the coarse graphite flakes as compared to use of an attrition impeller. The table below shows the results.

|  | −100 mesh headgrade | After stirring using the Flotation Rotor | After stirring using the Attrition Impeller |
| --- | --- | --- | --- |
| +100 mesh | 12.2% | 3.1% | 4.9% |
| 100/150 | 19.6 | 9.0 | 12.5 |
| 150/200 | 20.4 | 15.7 | 19.0 |
| 200/270 | 17.1 | 22.4 | 22.1 |
| 270/325 | 6.3 | 14.2 | 9.8 |
| −325 | 24.4 | 35.6 | 31.7 |

This showed that the attrition impeller action was less destructive to the flakes than the flotation rotor. These initial studies, which were done on −100 mesh flake graphite, showed that an impeller tip speed of 1945 ft/min. and a graphite:attrition adjuvant:water ratio of 1:2:2.5, were acceptable.

FIG. 1 shows the effect of increasing the tip speed of the impeller from 1195 to 1945 ft/min. Each test was conducted for 30 minutes. After attrition the carbon content of the samples was raised from about 68% to above 90%. The carbon contents of the entire −100 mesh fraction and the +325 mesh portion of the sample increased significantly as the tip speed of the impeller increased. The carbon content of the −325 mesh portion showed an insignificant increase. There was a slight loss in the amount of the −100 mesh sample due to process losses. However, there was a significant loss in the +325 mesh portion of the −100 mesh sample at the higher tip speed which indicated that the higher speeds were causing more −325 mesh particles to form as the coarser fractions were being abraded. At a tip speed of 1945 ft/min. about 80% of the original +325 mesh portion of the sample was preserved. This high yield of coarse particles was considered to be very good.

Figure 2:
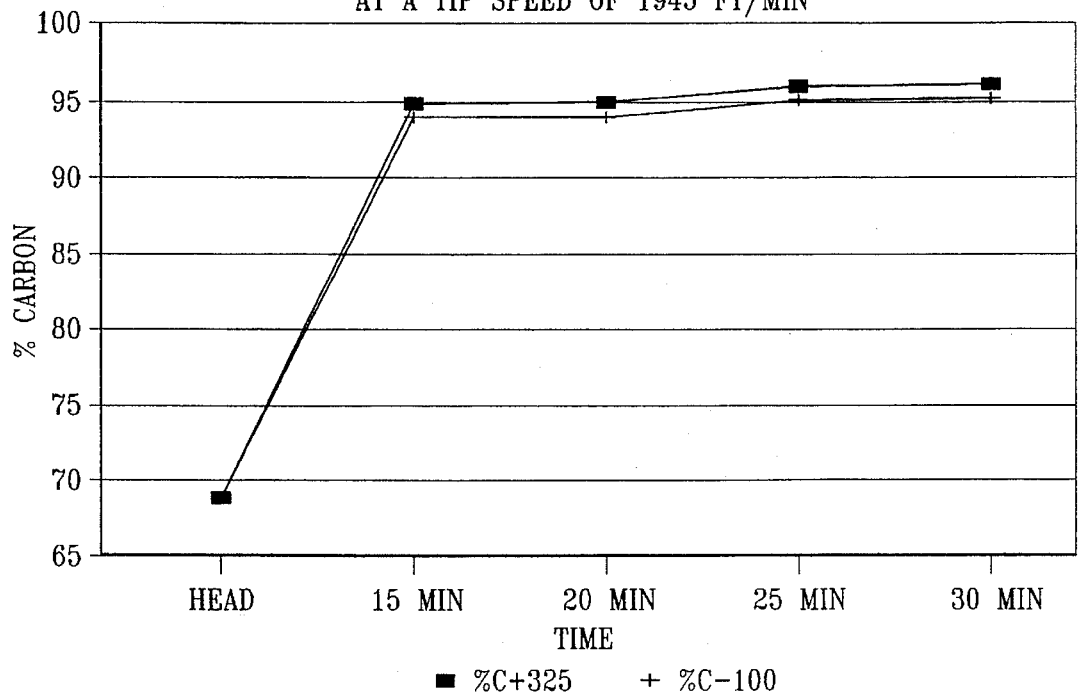
FIG. 2 is a graph showing flake graphite carbon content versus attrition time at a fixed tip speed.

FIG. 2 illustrates the effect of milling time. After just 15 minutes of attrition milling the carbon content of this −100 mesh sample was elevated from about 69% to about 94–95%. However, longer milling times resulted only in a slight increase in carbon content. The effect of attrition time on the purity level of coarser graphite was not studied. There was little difference in carbon content between the entire −100 mesh sample and the +325 mesh component of the sample.

However, FIG. 3 showed that the individual fractions within the +325 mesh sample had descending carbon contents as the size became finer. For instance, the +100 and the +150 fraction had about the same carbon contents, the +200 and the +270 mesh fraction also had >95% carbon, but the +325 and the −325 mesh portions showed an abrupt decrease in carbon contents. This figure also shows that longer milling times generally resulted in individual fractions with higher carbon contents.

Examples 2 and 3

Two tests were carried out at different solids content of the slurry, at 30% and at 70%. The tests were carried out using the attrition cell of Example 1. The slurry formulations and results after attrition are set forth in Table I below. Each of the slurries was subjected to attrition for 30 minutes with the 30% slurry exposed to an impeller speed of 3,000 rpm and the 70% slurry 2,700 rpm.

The screen analysis for each of the sands used as adjuvants in these Examples is set forth in Example 4 that follows:

TABLE I

| Ex. No. | 2 Wt. % | 3 Wt. % |
| --- | --- | --- |
| Flake Graphite* | 10 | 23.34 |
| #16 Grit Sand | 10 | 23.33 |
| #24 Grit Sand | 10 | 23.33 |
| Water | 70 | 30 |
| Graphite:adjuvant, water ratio | 1:2:7 | 1:2:1.3 |
| % carbon after attrition | 97% | 97% |

*−100 mesh flake graphite with a head grade of 65% carbon

Example 4

The next set of tests in the attrition cell were all conducted using a head grade of about 69% carbon, sized −100 mesh, a ratio of 1:2:2.5 of graphite: attrition adjuvant: water at an impeller tip speed of 1945 ft/min. for 30 minutes. The following attrition adjuvant were investigated.

Adjuvant

40 grit Sand
24 grit Sand
16 grit Sand
14 grit Sand
+14 mesh Graphitic Ore
10 grit Sand
+10 mesh Sand The screen analyses of the above mentioned adjuvants were:

| #40 Sand | | #24 Sand | | #16 Sand | |
|---|---|---|---|---|---|
| 35 mesh | 12% | 14 mesh | 4% | 10 mesh | <1% |
| 48 mesh | 23 | 20 mesh | 24 | 14 mesh | 34 |
| 65 mesh | 30 | 28 mesh | 38 | 20 mesh | 47 |
| 80 mesh | 13 | 35 mesh | 25 | 28 mesh | 17 |
| 100 mesh | 7 | 48 mesh | 7 | 35 mesh | 2 |
| 150 mesh | 8 | 65 mesh | 2 | 48 mesh | <1 |
| −150 mesh | 7 | −65 mesh | <1 | 65 mesh | <1 |
| Total | 100 | Total | 100 | Total | 100 |

| #14 Graphitic Ore | | +10 Mesh Sand | | #10 Sand | |
|---|---|---|---|---|---|
| −10/+24 mesh | 100% | −8/+10 mesh | 100% | 10 mesh | 55% |
| #14 Sand | | | | 14 mesh | 41 |
| | | | | 20 mesh | 3 |
| −10/+14 mesh | 100% | | | 28 mesh | <1 |
| | | | | 48 mesh | <1 |
| | | | | Total | 100 |

In all cases Tyler sieves were used in these analyses and all screen analyses shown hereafter.

The results of these tests were:

| Adjuvant | Carbon Content of −100 Mesh Sample % | Carbon Content of +325 Mesh Portion of the −100 mesh Sample % |
|---|---|---|
| #40 grit Sand | 89.3 | 89.3 |
| #24 grit Sand | 93.8 | 94.7 |
| #16 grit Sand | 95.3 | 96.4 |
| #14 grit Sand | 95.7 | 97.4 |
| +14 mesh Graphitic Ore | 95.1 | 96.5 |
| #10 grit Sand | 95.4 | 97.4 |
| +10 mesh Sand | 95.2 | 97.4 |

These data clearly showed that sand sizes from #10 to #24 were most effective at removing impurities from −100 mesh flakes. The data also showed that graphitic ore of similar size could be effectively used as the adjuvant. This was advantageous as it is preferred economically to use the ore rather than introduce a foreign component into the system. The % recovery of each fraction of the sample did not vary significantly except in the case where #40 sand was used. Use of this fine sand resulted in the least amount of −325 mesh produced during attrition.

In another experiment coarse flake graphite concentrates sized as shown below were subjected to attrition for 20 minutes using 10/14 mesh sand. The other parameters in this study were the same as before (i.e. 1945 ft/min. and 1:2:2.5 wt. ratio graphite:sand: water).

| Flake Size | Head Grade, % C | After Attrition % C |
|---|---|---|
| 28/48 mesh | 95.3 | 99.2 |
| 48/65 mesh | 93.0 | 99.4 |
| 48/150 mesh | 95.7 | 99.3 |
| 65/150 mesh | 94.6 | 99.3 |

The fines generated by attrition had the following carbon contents:

| Flake Size - Tyler Mesh | % C |
|---|---|
| 200 | 98.8 |
| 270 | 98.3 |
| 325 | 97.9 |
| −325 | 90.8 |

In another experiment a flake graphite concentrate which analyzed 96 to 97% carbon was subjected for 10 minutes at an impeller tip speed of 1945 ft/min. and at a loading of graphite:sand: water of 1:2:2.5. #16 sand was used as the abrading adjuvant. After flotation and screening the following analyses were obtained:

| Mesh | Carbon Content % | % Recovery: |
|---|---|---|
| From the +48 mesh portion of the attrited product: | | |
| 20 | 99.3 | 4.7 |
| 28 | 99.4 | 44.0 |
| 35 | 99.0 | 38.4 |
| 48 | 99.3 | 12.8 |
| | | 99.9 |
| From the 48/80 mesh portion of the attrited product: | | |
| 65 | 99.0 | 74.7 |
| 80 | 98.9 | 25.3 |
| | | 100.0 |
| From the 80/150 mesh portion of the attrited product: | | |
| 100 | 98.9 | 44.5 |
| 150 | 99.3 | 55.5 |
| | | 100.0 |
| From the −150 mesh portion of the attrited product: | | |
| 200 | 99.1 | 17.8 |
| 270 | 98.3 | 20.3 |
| 325 | 97.9 | 12.8 |
| −325 | 95.9 | 49.1 |
| | | 100.0 |

This again shows that after attrition for only 10 minutes flake graphite of 96% purity can be upgraded to 98+% purity. Only the fines (−325 mesh) generated by the milling had a purity level <98%.

Example 5

The attrition cell of Example 1 was used to attrit a 30% solids slurry of flake graphite concentrate and water for 30 minutes. No adjuvant was added and the head grade of the concentrate used was 52% carbon. After the 30 minute attrition cycle the carbon purity level of the sample was 78%. This large increase was obtained without use of any attrition adjuvant, with other tests showing that the use of an adjuvant, which is preferred, increased the purity level to a high 90% level for the same attrition time.

Example 6

A commercial eight cubic foot attrition cell was used to treat −100 mesh flake graphite concentrate with a head grade of 52% carbon.

A 60% solids slurry was formed of 45 kg of the flake graphite concentrate, 90 kg of +10 mesh sand, and 90 liters of water. The cell impeller speed was 300 rpm and the attrition was carried out for one hour. After attrition and recovery of the flake graphite its purity level was 92% carbon with a recovery rate of 82%. The +325 mesh portion of the sample had a carbon analysis of 98.2%.

These studies clearly demonstrate that coarse flakes also could be quickly upgraded to very high carbon contents by attrition for a relatively short period of time. While the coarse graphite flakes tested came from a single deposit it is not known with certainty how amenable coarse flakes from a variety of deposits formed under various geological conditions are to benefication by the attrition process. It can be stated, however, that the primary objective of this invention; that is, to quickly and economically upgrade the carbon level of flake graphite without causing a drastic decrease in particle size has been fully met by this invention.

These results are surprising and unexpected since the attrition adjuvants such as sand, are harder than the graphite flake and would be expected to cause rapid disintegration of the flakes.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of beneficiating flake graphite to higher carbon content comprising forming an aqueous pulp comprising a flake graphite concentrate, an attrition adjuvant, and water, subjecting said pulp to attrition at an impeller speed, pulp solids concentration, and for a time sufficient to remove impurities from said flake graphite surfaces without significant reduction of flake size, and separating said attrited flake graphite from said pulp.

2. The method of claim 1 in which the pulp consists essentially of flake graphite, attrition adjuvant, and water in a weight ratio of about 1:2:0.8 to 10.

3. The method according to claim 1 in which the attrition adjuvant is a silica sand, graphitic ore, or mixture thereof.

4. The method of claim 1 wherein the mesh size of said flake graphite concentrate is −100 mesh and the solids content of the slurry is from about 30% to 70% solids.

5. The method of claim 1 wherein the purity of the flake graphite is increased to at least 99% carbon.

6. The method of claim 5 wherein the purity of the flake graphite is increased to at least 99% carbon.

7. A method of increasing the purity of flake graphite comprising forming an aqueous pulp comprising a flake graphite concentrate, an attrition adjuvant selected from +35 mesh sand, +35 mesh graphite ore, or a mixture thereof, and water in a weight ratio of about 1:2:0.8 to 10, subjecting said pulp to attrition at an impeller speed and for a time sufficient to remove impurities from said flake graphite surfaces without significant reduction in flake size, and separating said attrited flake graphite from said pulp.

8. The method of claim 4 wherein the purity of said flake graphite is increased to at least 99% carbon.

9. The method of claim 7 wherein the purity of said flake graphite is increased to at least 99% carbon.

10. The method of claim 9 wherein the purity of said flake graphite is increased to at least 99% carbon.

* * * * *